(12) United States Patent
Gu

(10) Patent No.: US 6,173,009 B1
(45) Date of Patent: Jan. 9, 2001

(54) STATE CALCULATION CIRCUIT FOR DISCRETE LINEAR STATE SPACE MODEL

(75) Inventor: Zhenguo Gu, Plano, TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/222,454

(22) Filed: Dec. 29, 1998

(51) Int. Cl.$^7$ ................................................ H04L 27/06
(52) U.S. Cl. ........................ 375/150; 375/152; 375/343
(58) Field of Search .................... 708/250, 251, 708/252–253, 254, 255, 256; 380/46; 375/130, 142, 143, 150, 152, 343

(56) References Cited

U.S. PATENT DOCUMENTS

| | | | |
|---|---|---|---|
| 4,224,664 | * | 9/1980 | Trinchieri .............................. 709/25 |
| 4,748,576 | * | 5/1988 | Beker et al. ......................... 708/250 |
| 4,965,881 | * | 10/1990 | Dilley ...................................... 4/517 |
| 5,033,048 | * | 7/1991 | Pierce et al. ......................... 714/719 |
| 5,228,054 | | 7/1993 | Rueth et al. ............................. 375/1 |
| 5,251,238 | * | 10/1993 | Menk et al. ........................... 375/343 |
| 5,258,936 | * | 11/1993 | Gallup et al. ........................ 708/254 |
| 5,297,207 | * | 3/1994 | Degele .................................... 380/46 |
| 5,383,143 | * | 1/1995 | Crouch et al. ....................... 708/254 |
| 5,446,683 | * | 8/1995 | Mullen et al. ....................... 708/256 |
| 5,566,099 | * | 10/1996 | Shimada ............................... 708/250 |
| 5,910,907 | * | 6/1999 | Chen et al. ............................. 380/50 |
| 5,926,070 | * | 6/1999 | Barron et al. ........................ 708/250 |
| 5,974,433 | * | 10/1999 | Currie .................................. 708/252 |
| 6,064,670 | * | 5/2000 | Athenes et al. ...................... 370/375 |

OTHER PUBLICATIONS

"Report On FPLMTS Radio Transmission Technology Special Group", (Round 2 Activity Report), Association of Radio Industries and Business (arib), FPLMTS Study Committee, Draft Version E1.1, Jan. 10, 1997, 224 pages.

"Proposed Wideband CDMA (W–CDMA)", Association of Radio Industries and Businesses (ARIB), Japan, Jan. 1997, 213 pages.

* cited by examiner

*Primary Examiner*—Melvin Marcelo
*Assistant Examiner*—Phuongchau Ba Nguyen
(74) *Attorney, Agent, or Firm*—Robert N. Rountree; Frederick J. Telecky Jr.

(57) ABSTRACT

A circuit is designed to receive a plurality of index signals (320, 321). The circuit includes a memory circuit arranged to store a plurality of state vectors (400–403). A multiplex circuit (406) is coupled to the memory circuit. The multiplex circuit selectively produces one of the state vectors (408) in response to at least one of the index signals (320). A matrix generator circuit (410) is arranged to produce a variable matrix in response to at least another of the index signals (321). A logic circuit (600–602) is coupled to the multiplex circuit and the matrix generator circuit. The logic circuit is arranged to produce a logical combination (412) of the variable matrix and said one of the state vectors.

25 Claims, 3 Drawing Sheets

US 6,173,009 B1

STATE CALCULATION CIRCUIT FOR DISCRETE LINEAR STATE SPACE MODEL

FIELD OF THE INVENTION

This invention relates to code division multiple access (CDMA) for a communication system and more particularly to a state generator circuit for generating a state vector having an arbitrary offset from an initial state.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. Base stations in adjacent cells or transmit areas also have a unique pseudorandom noise (PN) code associated with transmitted data. This PN code is typically generated by a Linear Feedback Shift Register (LFSR), also known as a Linear Sequence Shift Register, and enables mobile stations within the cell to distinguish between intended signals and interference signals from other base stations. Identification of a PN code requires the mobile station to correctly identify an arbitrary part of the received PN sequence. The identification is frequently accomplished by a sliding window comparison of a locally generated PN sequence with the received part of the PN sequence. The sliding window algorithm often requires the mobile station to efficiently calculate multiple offsets from the LFSR to match the received sequence.

In another application of an LFSR (FIG. 1), the mobile unit typically generates a PN sequence by a combination of one or more LFSRs 100, 122 as in FIG. 1. This PN sequence is used for quadrature phase shift keyed (QPSK) reverse link transmission. This transmission requires that the PN sequence be arbitrarily shifted by the number of chips equivalent to 250 microseconds for transmitting the in-phase component and the quadrature component. This arbitrary shift may vary with data rate.

Another application of an arbitrary offset LFSR arises for spreading and despreading transmitted signals as disclosed in U.S. Pat. No. 5,228,054 by Timothy I. Rueth and incorporated herein by reference. Rueth discloses an advantage of modulating each data bit at a constant chip rate for various transmit data rates. For example, a constant chip rate produces 128 chips for each bit at 9600 bits per second and 256 chips for each bit at 4800 bits per second. Thus, the chip rate may remain constant while the transmitted data rate may vary in response to rate information from a base station. Rueth further teaches that synchronization of base and mobile stations is simplified by inserting a zero in the PN sequence, thereby increasing the number of states from $2^N-1$ to $2^N$. Synchronization is further simplified by including an arbitrary offset circuit for the LFSR. Rueth teaches a mask circuit 30 in combination with an N-bit LFSR 10 (FIG. 2) for producing a PN offset with respect to the LFSR state. The mask circuit 30 produces the desired offset in response to a mask signal MASK on bus 32. Rueth gives a specific example of a particular mask signal for a 10-chip offset for an exemplary 4-bit LFSR (col. 7, lines 37–40). Rueth, however, fails to teach or suggest how the mask signal is generated for this specific case or how the mask signal might be generated for an LFSR of arbitrary length. Rueth states that "it would be simplest to implement if the paired values of OFFSET and MASK were pre-computed and stored in a Read Only memory (ROM) not shown." (col. 8, lines 63–66). For a 15-bit LFSR, however, this would require $2^N-2$ (32,722) 15-bit masks. A particular problem with generation of this mask signal, therefore, is the need for a simple circuit to generate states with an arbitrary offset from an LFSR state. Other problems include the practical memory limitation of mobile handsets, calculation complexity of offset determination and speed and power requirements to generate the offset.

SUMMARY OF THE INVENTION

These problems are resolved by a circuit designed to receive a plurality of index signals. The circuit includes a memory circuit arranged to store a plurality of state vectors. A multiplex circuit is coupled to the memory circuit. The multiplex circuit selectively produces one of the state vectors in response to at least one of the index signals. A matrix generator circuit is arranged to produce a variable matrix in response to at least another of the index signals. A logic circuit is coupled to the multiplex circuit and the matrix generator circuit. The logic circuit is arranged to produce a logical combination of the variable matrix and said one of the state vectors.

The present invention produces a state vector with an arbitrary offset from an initial state vector with minimal power and gate delay. Memory storage requirements for transition matrices are minimized.

BRIEF DESCRIPTION OF THE DRAWINGS

A more complete understanding of the invention may be gained by reading the subsequent detailed description with reference to the drawings wherein.

DETAILED DESCRIPTION OF THE PREFERRED EMBODIMENTS

Figure 1:
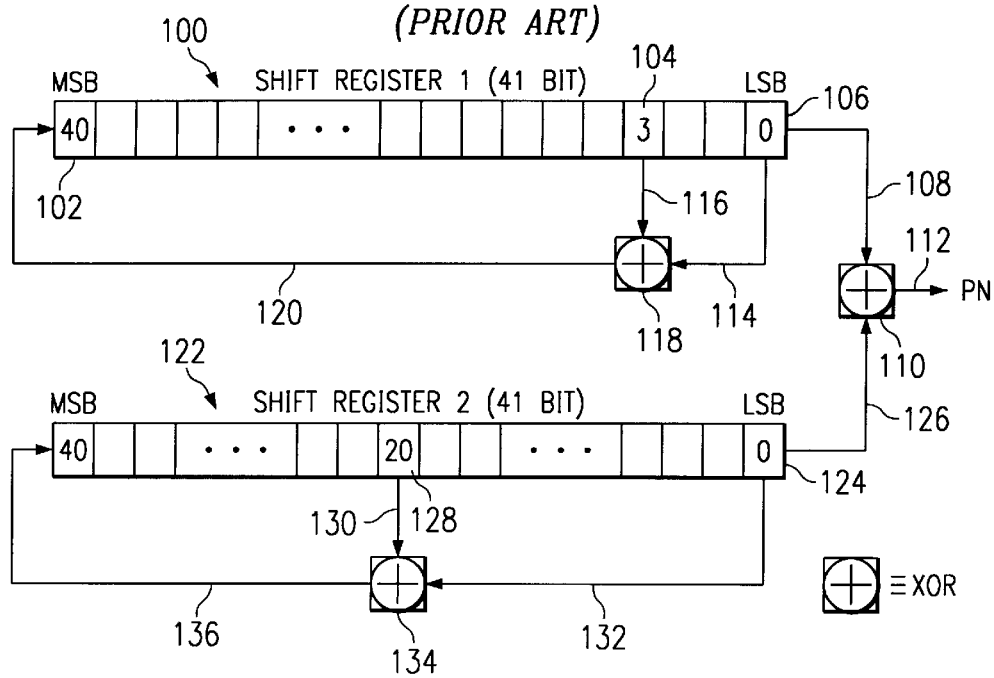
FIG. 1 is a simplified block diagram of a linear feedback shift register of the prior art.
Figure 2:
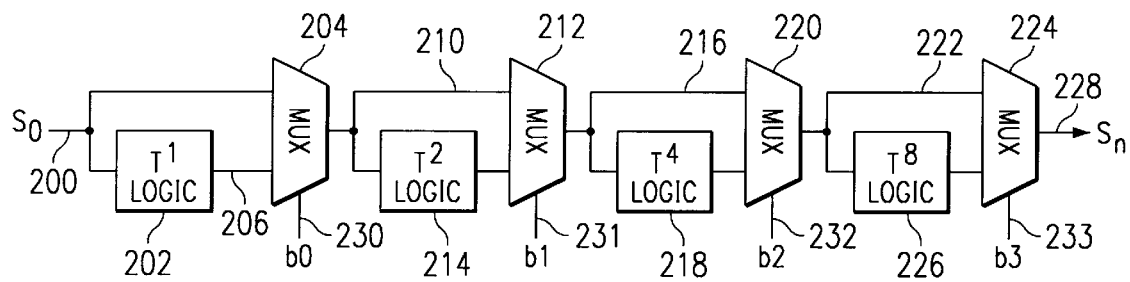
FIG. 2 is a block diagram of a series connection of state generator circuits.

Referring to FIG. 2, there is a block diagram of a series connection of state generator circuits of the present invention that may be used for an exemplary 4-bit LFSR. This exemplary 4-bit LFSR has $2^N-1$ or 15 states. Each state generator circuit includes, for example, a memory circuit (not shown) to store a transition matrix and a combinatorial logic circuit 202. The first state generator circuit in the series receives an input state matrix on bus 200 corresponding to an initial state $S_0$. This initial state is applied directly to one set of input terminals of multiplex circuit 204 and to the logic circuit 202. The logic circuit 202 is coupled via bus 206 to another set of input terminals of the multiplex circuit 204. An index signal b0 corresponding to one bit of an offset signal on lead 230 selectively applies the signal on bus 200 or on bus 206 to the output bus 210 which is an input bus for the next series state generator circuit.

In operation, the output of logic circuit 202 is a logical combination of the input state matrix and the stored transition matrix. This logical combination is preferably a modulo 2 matrix multiplication for producing a state matrix or vector that is offset from the input state matrix by an index signal. In general, this new state is determined by equation [1].

$$S_n = T^n S_0 \quad [1]$$

The state matrix $S_n$ is offset from initial state matrix $S_0$ by n states of the PN sequence. The transition matrix $T^n$ is an initial transition matrix raised to the power n. This transition matrix has a form determined by the design of the LFSR as will be explained in detail Although the 4-bit index signal b0–b3 is suitable for producing any offset for the exemplary 4-bit LFSR, the concept of the present invention may be extended to any N-bit index signal for a corresponding N-stage LFSR. The 4-bit index signal on leads 230–233 may be represented in binary form as shown in equation [2].

$$n = 2^3 b3 + 2^2 b2 + 2^1 b1 + 2^0 b0 \quad [2]$$

A corresponding transition matrix for producing an arbitrary offset from initial state $S_0$ is then represented by equation [3].

$$T^n = T^{8b3} T^{4b2} T^{2b1} T^{b0} \quad [3]$$

Any transition matrix having an arbitrary n exponent, therefore, may be calculated by storing weighted matrices in memory circuits with the respective logic circuits 202, 214, 218 and 226. Any zero-value bit index signal on leads 230–233 couples the respective input state matrix bus, for example bus 200 to output state matrix bus 210. Alternatively, any one-value bit index signal on leads 230–233 applies the respective modulo-2 matrix product on bus 206, for example, to state output matrix bus 210. Thus, an arbitrary offset state matrix $S_n$ is generated at state output matrix bus 228 of the last state generator of the series by selectively multiplying an initial state matrix or vector $S_0$ by weighted transition matrices in logic circuits 202, 214, 218 and 226. This circuit is highly advantageous for efficiently producing an arbitrary transition matrix. Memory requirements are greatly reduced by storing only weighted matrices rather than the matrices for each desired offset. For example, one additional state generator circuit would produce 31 possible transition matrices. Two additional state generator circuits would produce 63 possible transition matrices. Moreover, computation time and power are minimized by use of combinatorial logic as will be described in detail.

Figure 3:
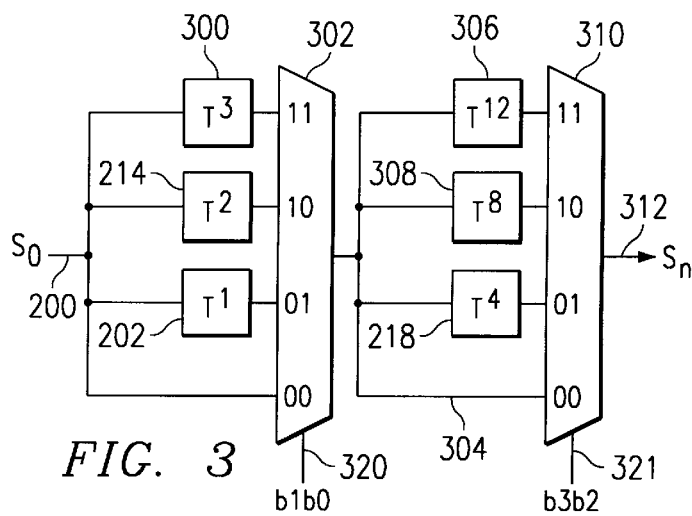
FIG. 3 is a block diagram of state generator circuits connected in series and in parallel.

Referring now to FIG. 3, there is another embodiment of the state generator circuit of the present invention. This embodiment is arranged in a parallel and series configuration to reduce propagation delay. A first state generator circuit includes logic circuits 202, 214 and 300 for storing three least significant transition matrices. Output states from these logic circuits and the input state matrix on bus 200 are applied to four sets of input terminals of multiplex circuit 302. Two least significant bits b0 and b1 of the index signal are applied to the multiplex circuit via bus 320 for selectively coupling one of the four sets of input terminals to output bus 304. Thus, index signal bits b0 and b1 selectively generate a transition matrix for producing a zero to three-state offset. The state matrix at bus 304, therefore, is equivalent to the state matrix on bus 216 in the embodiment of FIG. 2. A significant difference, however, is that the embodiment of FIG. 3 introduces gate propagation delays of only one logic circuit. In a similar manner, a second state generator circuit including logic circuits 218, 308 and 306 and multiplex circuit 310 are equivalent to the last two state generator circuits of FIG. 2. By way of comparison with the embodiment of FIG. 2, therefore, the embodiment of FIG. 3 requires half of the gate propagation delay from initial state $S_0$ to offset state $S_n$, but requires more matrix storage area.

Figure 4:
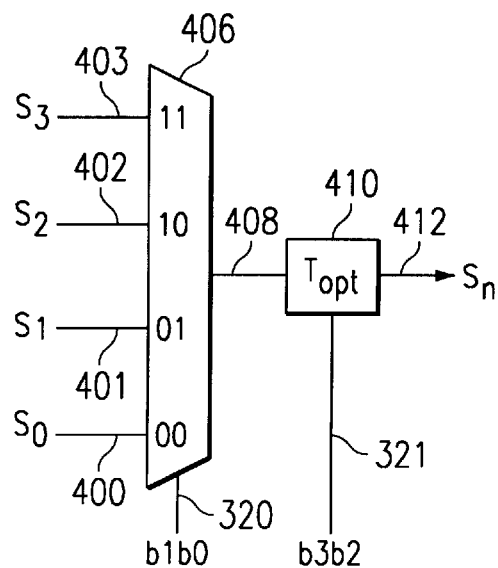
FIG. 4 is a block diagram of a state generator circuit with a variable matrix generator circuit.

Turning now to FIG. 4, there is yet another embodiment of a state generator circuit with a variable matrix generator circuit. Multiplex circuit 406 receives state input matrices $S_0-S_3$ on buses 400–403, respectively. One of these four state matrices or vectors is selectively applied to output bus 408 in response to least-significant index signal bits b0 and b1 on bus 320. This corresponds to the first two state generator circuits of FIG. 2 and the first state generator circuit of FIG. 3. Logic circuit 410 generates a variable matrix from logic equations of bit-index signals b2 and b3 corresponding to transition matrices $T^4$, $T^8$ and $T^{12}$. As with the embodiments of FIG. 2 and FIG. 3, bit-index signals of 00 couple bus 408 to bus 412. The logic circuit 410 multiplies the selected state matrix on bus 408 by the variable matrix to produce offset state matrix $S_n$ on bus 412. This embodiment is highly advantageous in producing an offset state matrix within the gate propagation delay of a single logic circuit 410. Moreover, modulo 2 matrix multiplication is performed by combinatorial logic with minimal logic gates and power consumption.

By way of example, bit-index signals b3–b0 of 0101 produce a desired offset state $S_5$ from an in initial state. Bit-index signals b1 and b0 having a value 01 are applied to multiplex circuit 406 to select state $S_1$. Values of the variable matrix of logic circuit 410 are determined by bit-index signals b3 and b2 having a value 01 according to equations [4–10]. These logic equations are derived from Boolean minimization of transition matrices $T^4$, $T^8$ and $T^{12}$ as is well known to those of ordinary skill in the art.

$$t_{11} = t_{22} = t_{33} = \overline{b3} + b2 \quad [4]$$

$$t_{12} = t_{23} = t_{34} = t_{41} = b3 \oplus b2 \quad [5]$$

$$t_{13} = t_{24} = t_{42} = \overline{b3} \cdot b2 \quad [6]$$

$$t_{14} = t_{43} = b3 + b2 \quad [7]$$

$$t_{21} = t_{32} = b3 \quad [8]$$

$$t_{31} = b3 \cdot \overline{b2} \quad [9]$$

$$t_{44} = \overline{b2} \quad [10]$$

Figure 5:
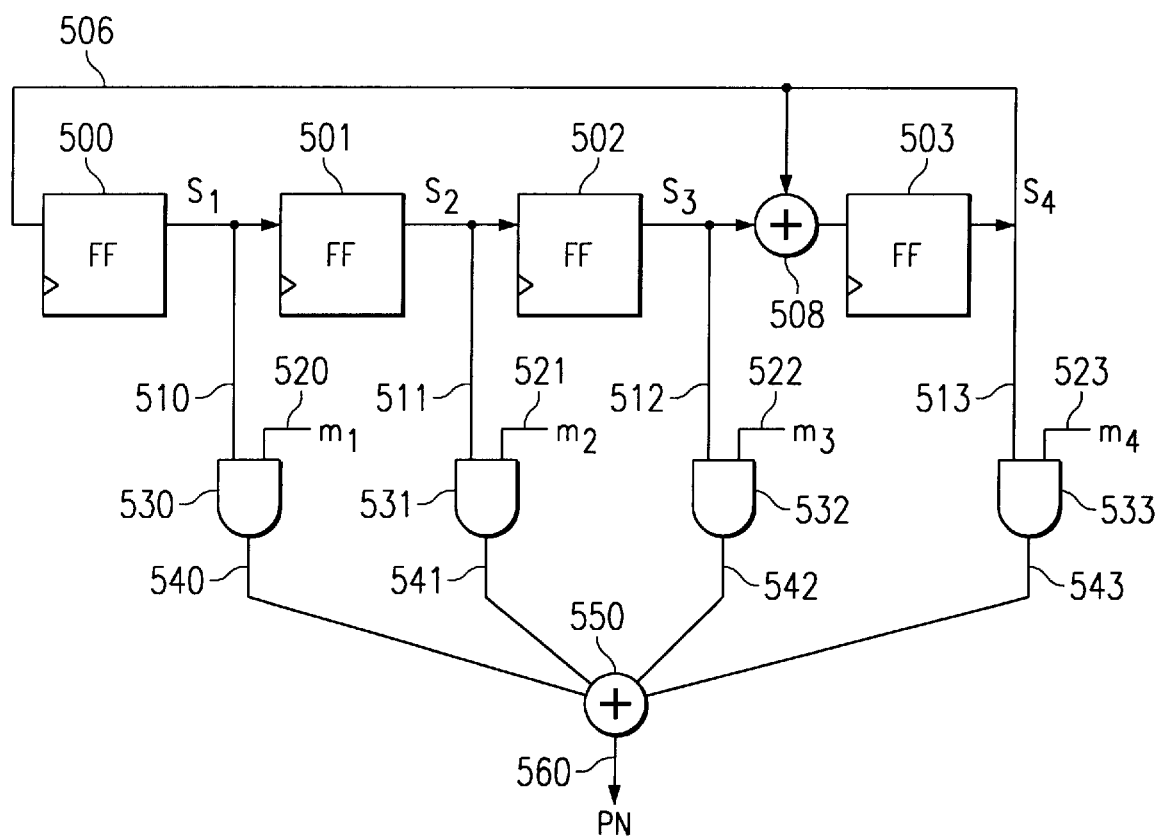
FIG. 5 is a block diagram of a shift register circuit for generating a pseudorandom noise sequence including a mask register for changing the pseudorandom noise state.

The initial transition matrix T is a 4×4 square matrix having the form of equation [11] corresponding to the 4-stage LFSR of FIG. 5. The top row of the initial transition matrix includes zero elements $t_{11}-t_{13}$ and a one in element $t_{14}$. The I of equation [11] indicates a 3×3 square identity matrix having ones along the upper-left to lower-right diagonal and zeros elsewhere. The 3-element vector c corresponds to coefficients $C_1-C_3$ of the PN polynomial of equation [13] in elements $t_{42}-t_{44}$ or [001], respectively. In general, the form of this initial transition matrix T remains the same for any N-length LFSR as in FIG. 5, and the vector c with a length N−1 is determined by the location of the exclusive-OR (XOR) feedback gates such as 508.

$$T = \begin{bmatrix} 0 & 1 \\ I & c \end{bmatrix} \quad [11]$$

Variable matrix $T^4$ is multiplied by state vector $S_1$ to produce offset state vector $S_5$ as in equation [12].

$$\begin{bmatrix} 1 \\ 1 \\ 1 \\ 0 \end{bmatrix} = \begin{bmatrix} 1 & 1 & 1 & 1 \\ 0 & 1 & 1 & 1 \\ 0 & 0 & 1 & 1 \\ 1 & 1 & 1 & 0 \end{bmatrix} \begin{bmatrix} 1 \\ 0 \\ 0 \\ 1 \end{bmatrix} \quad [12]$$

Figure 6:
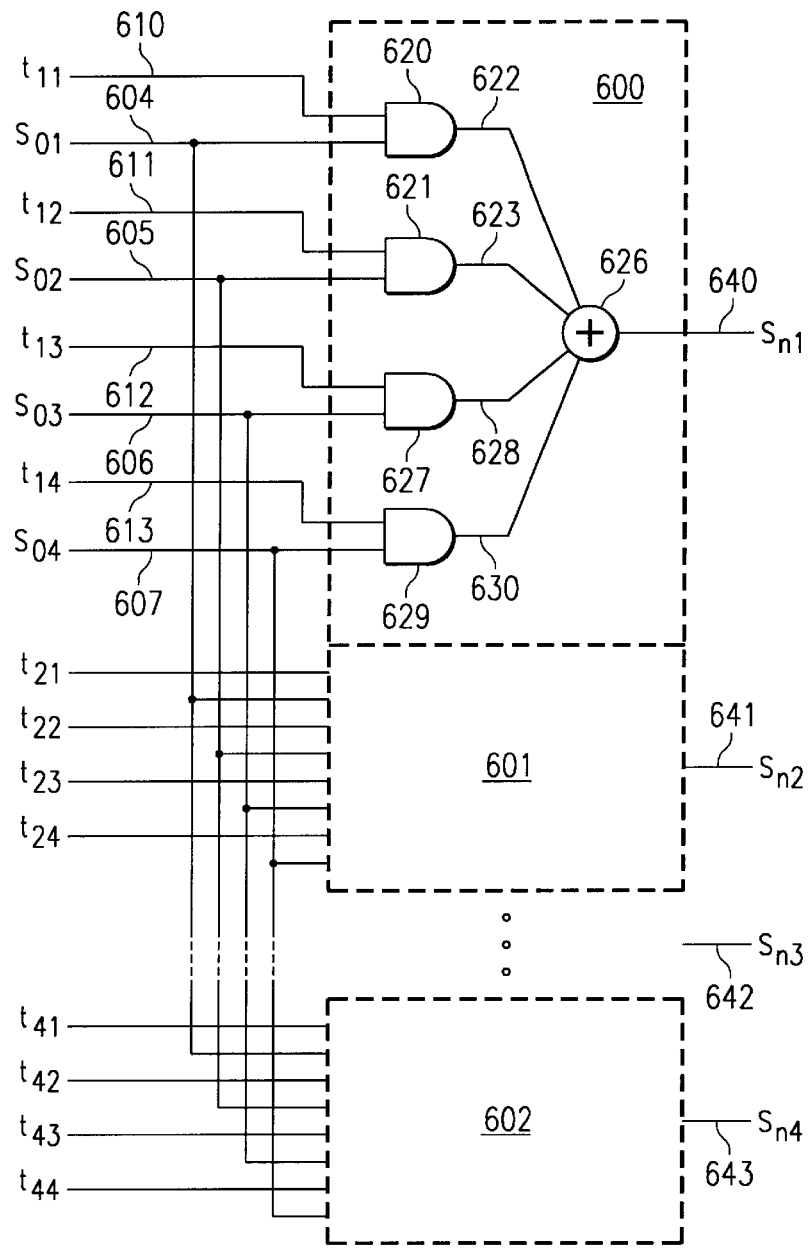
FIG. 6 is a schematic diagram of a matrix multiplier circuit that may be used with state generator circuits of FIG. 2-FIG. 4.

This multiplication is performed by the circuit of FIG. 6 which is included in logic circuit 410 (FIG. 4) and in logic circuits of FIG. 2 and FIG. 3. The multiplication circuit includes a respective stage 600–602 for each element $s_{n1}$–$s_{n4}$ of state matrix $S_n$ at bus 412. Stage 600, for example, receives variable transition matrix elements $t_{11}$–$t_{14}$ and state matrix elements $S_{01}$–$S_{04}$ from bus 408 at respective AND gates 620, 621, 627 and 629. Output signals from AND gates 620 and 621 are applied to XOR gate 624. Output signals from AND gates 627 and 629 are applied to XOR gate 631. XOR gate 626 receives the output signals from XOR gates 624 and 631 and produces respective state matrix element $S_{n1}$. Thus, modulo 2 multiplication of the top row of the variable transition matrix by a selected one of state vectors $S_0$–$S_3$ is performed by stage 600 in three gate propagation delays. Multiplication of the remaining rows of variable transition matrix $T^n$ is performed in parallel by stages 601–602. This circuit is highly advantageous in multiplying any arbitrary transition matrix by a state vector with minimal logic and power. Thus, an arbitrary offset from an initial state matrix is efficiently produced with minimal memory storage requirements.

Referring now to FIG. 5, there is an LFSR circuit for generating a PN sequence including a mask register for producing an arbitrary PN offset. The 4-bit LFSR of FIG. 5 is arranged to produce a PN sequence corresponding to the polynomial of equation [13]. The initial transition matrix has the form previously described for equation [11].

$$PN = 1 + c_1 x^1 + c_2 x^2 + c_3 x^3 + x^4 \quad [13]$$

The LFSR includes four series connected flip-flops operated synchronously by a clock signal (not shown). Flip-flop circuits 502 and 503 are coupled in series by XOR gate 508. Each element of the LFSR state matrix at the output of a respective flip-flop is applied to one input terminal of a respective AND gate 530–533 via leads 510–513. Mask signals $m_1$–$m_4$ are applied to leads 520–523, respectively. Output signals of the AND gates are applied to XOR gate 550. The XOR gate produces a PN sequence at lead 560. The mask signals $m_1$–$m_4$ are elements of mask vector $M_n$. In general, the value of mask vector $M_n$ is given by equation [14].

$$M_n = M_0 T^n \quad [14]$$

Transition matrix $T^n$ is the initial transition matrix of equation [11] raised to the $n^{th}$ power. Elements $m_1$–$m_4$ of initial mask vector $M_0$ have values 0001, respectively. Application of this initial mask vector to the circuit of FIG. 5 produces a PN sequence that is the same as signal $s_4$ at lead 506. The PN sequence is shifted by n states from an initial state by the application of mask vector $M_n$ to leads 520–523. This circuit and mask generation technique may be applied to any N-length LFSR to gain the advantages of the present invention.

Figure 7A:
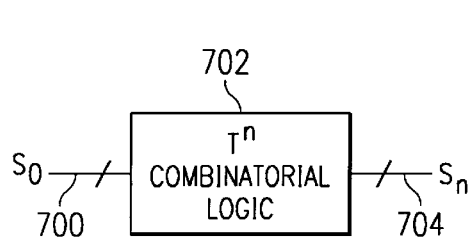
FIG. 7A is block diagram of hardwired combinatorial logic circuits that may be used for transition matrix multiplication.
Figure 7B:
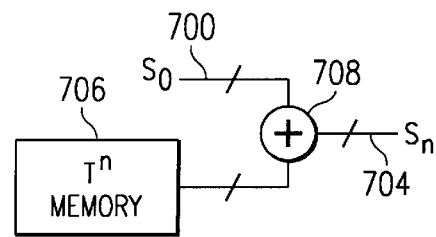
FIG. 7B is a block diagram of a memory circuit that may be used for transition matrix multiplication.

Although the invention has been described in detail with reference to its preferred embodiment, it is to be understood that this description is by way of example only and is not to be construed in a limiting sense. For example, previously described techniques of FIG. 2–FIG. 4 for generating state matrices may be used to generate any arbitrary transmission matrix by substituting an initial transition matrix for an initial state vector. The output would then be a transition matrix $T^n$ as determined by bit index signals b3–b0. Furthermore, the previously described transition matrix-vector multiplication of FIG. 2 through FIG. 4 as in 202, 214, 218, 226 and following, may be accomplished by hard-wired combinatorial logic circuits (FIG. 7A). The logic equations for the combinatorial logic are derived by Boolean minimization of the appropriate transition matrix. This technique eliminates the need for memory to store transition matrices and improves speed. A disadvantage however, is the inherent lack of programmability. Alternatively, the circuit of FIG. 7B includes programmable memory array 706 for storing the appropriate transition matrix. Logic circuit 708 produces a modulo-2 matrix product $S_n$ at bus 704 of transition matrix $T^n$ and initial state matrix $S_0$. This circuit provides programmability and substantially the same speed but requires memory for transition matrix storage. In another embodiment of the present invention, circuits of FIG. 2–FIG. 7 may be implemented in software by a digital signal processor as is well known to those of ordinary skill in the art.

It is understood that the inventive concept of the present invention may be embodied in a mobile communication system as well as circuits within the mobile communication system. It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A circuit coupled to receive a plurality of index signals, comprising:

a memory circuit arranged to store at least one matrix;

a multiplex circuit coupled to the memory circuit, the multiplex circuit selectively producing the at least one matrix in response to at least one of the index signals;

a matrix generator circuit arranged to produce a variable matrix in response to at least another of the index signals; and a logic circuit coupled to the multiplex circuit and the matrix generator circuit, the logic circuit arranged to produce a logical combination of the variable matrix and said one of the matrices.

2. A circuit as in claim 1, wherein the at least one matrix is a state of a linear feedback shift register.

3. A circuit as in claim 2, wherein the state comprises adjacent states of a sequence of states.

4. A circuit as in claim 1, wherein the at least one matrix is N adjacent state vectors of a sequence of state vectors and wherein the variable matrix includes plural matrix values, each matrix value differing from another matrix value by an exponent N.

5. A circuit as in claim 1, wherein the logical combination is a modulo 2 matrix multiplication.

6. A circuit as in claim 5, wherein the matrix multiplication is performed by a combinatorial logic circuit.

7. A circuit coupled to receive a plurality of index signals, comprising:

a memory circuit arranged to store a plurality of matrices;

a plurality of logic circuits coupled to receive an input matrix, each logic circuit coupled to a respective matrix of the plurality of matrices, each logic circuit arranged to produce a logical combination of the input matrix and the respective matrix; and a multiplex circuit coupled to receive each said logical combination from each said logic circuit, the multiplex circuit selectively producing one said logical combination in response to at least one of the plurality of index signals.

8. A circuit as in claim 7, wherein the input matrix is a state vector of a linear feedback shift register.

9. A circuit as in claim 7, wherein each matrix of the plurality of matrices differs from another matrix of the plurality of matrices by an exponent.

10. A circuit as in claim 7, wherein the logical combination is a modulo 2 matrix multiplication.

11. A circuit as in claim 10, wherein the matrix multiplication is performed by a combinatorial logic circuit.

12. A circuit as in claim 7, further comprising:

a plurality of second logic circuits coupled to receive said logical combination from said multiplex circuit, each second logic circuit coupled to a respective second matrix of the plurality of matrices, each second logic circuit arranged to produce a second logical combination of said logical combination from said multiplex circuit and the respective second matrix; and a second multiplex circuit coupled to receive each said second logical combination from each said second logic circuit, the multiplex circuit selectively producing one said second logical combination in response to at least one of the plurality of index signals.

13. A circuit coupled to receive a plurality of index signals, comprising:

a series of state generator circuits, a first state generator circuit in the series coupled to receive an input state matrix, a last state generator circuit in the series arranged to produce an output state matrix, each state generator circuit comprising:

a memory circuit having a respective stored matrix;

a logic circuit coupled to receive a respective input matrix and the respective stored matrix, the logic circuit arranged to produce a respective logical combination of the respective input matrix and the respective stored matrix; and a multiplex circuit coupled to receive the respective input matrix and the respective logical combination from each said logic circuit, the multiplex circuit selectively producing one of the respective input matrix and the respective logical combination in response to at least one respective index signal of the plurality of index signals.

14. A circuit as in claim 13, wherein the output state matrix is a state of a linear feedback shift register.

15. A circuit as in claim 13, wherein each said respective stored matrix differs from another said respective stored matrix by an exponent.

16. A circuit as in claim 13, wherein a product of a first said respective stored matrix and a second said respective stored matrix is equal to a third said respective stored matrix.

17. A circuit as in claim 13, wherein the logical combination is a modulo 2 matrix multiplication.

18. A circuit as in claim 17, wherein the matrix multiplication is performed by a combinatorial logic circuit.

19. A circuit as in claim 13, wherein the input state matrix is a first mask matrix, each said respective stored matrix is a transition matrix having a different exponent, and the output state matrix is a second mask matrix.

20. A circuit as in claim 19, further comprising:

a linear feedback shift register arranged to produce a plurality of output signals including a first pseudorandom noise sequence in response to each cycle of a clock signal; and a mask circuit coupled to receive the second mask matrix and the plurality of output signals, wherein the mask circuit produces a second pseudorandom noise sequence shifted a number of clock cycles from the first pseudorandom noise sequence in response to the second mask matrix.

21. A method of producing a predetermined state matrix for a mobile communications system comprising the steps of:

producing an initial state matrix:

producing a plurality of transition matrices, each transition matrix having a different order;

receiving an index signal; and producing a product of the initial state matrix and selected transition matrices of the plurality of transition matrices in response to the index signal.

22. A method as in claim 21, further including the steps of:

applying the product and a sequence of state matrices including a first pseudorandom noise sequence to a mask circuit; and producing a second pseudorandom noise sequence shifted from the first pseudorandom noise sequence in response to the product.

23. A circuit as in claim 1, wherein the memory circuit comprises a hard-wired combinatorial logic circuit.

24. A circuit as in claim 7, wherein the memory circuit comprises a hard-wired combinatorial logic circuit.

25. A circuit as in claim 13, wherein the memory circuit comprises a hard-wired combinatorial logic circuit.

* * * * *